United States Patent [19]
Lorenz

[11] 4,410,020
[45] Oct. 18, 1983

[54] SENSOR SYRINGE

[75] Inventor: Adrian Lorenz, Zurich, Switzerland

[73] Assignee: Contraves AG, Zurich, Switzerland

[21] Appl. No.: 247,904

[22] Filed: Mar. 26, 1981

[30] Foreign Application Priority Data

Apr. 23, 1980 [CH] Switzerland .................. 3124/80

[51] Int. Cl.³ .............................................. B65B 3/04
[52] U.S. Cl. ....................................... 141/65; 141/94;
141/284; 73/293; 250/227; 340/619; 350/96.2
[58] Field of Search ...................... 141/1–12,
141/65, 66, 250, 192, 284, 94, 95, 96; 73/293,
327; 324/65 P; 137/386; 350/96.2, 96.24;
250/227; 340/619; 33/126.7 A, 126.4 R

[56] References Cited

U.S. PATENT DOCUMENTS

| 3,434,513 | 3/1969 | O'Bannon . |
| 3,843,326 | 10/1974 | Lichtenstenen .................. 141/65 |
| 4,038,650 | 7/1977 | Evans et al. .................... 73/293 |
| 4,053,002 | 10/1977 | Ludlow . |

FOREIGN PATENT DOCUMENTS

| 1118480 | 11/1961 | Fed. Rep. of Germany . |
| 1961342 | 6/1970 | Fed. Rep. of Germany . |
| 1938032 | 1/1971 | Fed. Rep. of Germany . |
| 545989 | 2/1974 | Switzerland . |
| 590472 | 8/1977 | Switzerland . |

*Primary Examiner*—Houston S. Bell, Jr.
*Attorney, Agent, or Firm*—Werner W. Kleeman

[57] ABSTRACT

A sensor syringe or hollow needle arrangement for the automatic withdrawal of a liquid sample from a liquid contained within a vessel. A duct is enclosed in a sheath or jacket-like manner by a light conductor possessing an inlet for an optical source and an outlet leading to an optical detector. During sample withdrawal there is utilized the change in the reflection behavior of the lower end of the light conductor upon its immersion in the liquid in order to control sample withdrawal.

3 Claims, 3 Drawing Figures

SENSOR SYRINGE

BACKGROUND OF THE INVENTION

The present invention relates to a new and improved construction of a sensor syringe or hollow tubular needle arrangement for the automatic withdrawal of a sample from a liquid contained within a vessel or the like and which automatically adjusts its position with respect to the unknown liquid surface.

If it is necessary to withdraw numerous liquid samples with consistent accuracy, or whenever access to the sample removal site is difficult, the withdrawal of the sample advantageously is carried out by an automatic mechanism. Also in those fields of application where manual sample removal would endanger the operating personnel due to radiation or chemical effects, it is absolutely necessary that the sample be withdrawn automatically.

Apart from reliability in operation there is also imposed upon a sensor syringe the requirement that the liquid samples are not altered, for instance due to electrical effects, and that the syringe itself not be impaired as to its operational integrity by the liquid sample.

With the aim of fulfilling these requirements there have been employed sensor syringes which detect the position of the surface of the liquid by virtue of changes in a measured physical parameter, and through the use of a suction device withdraw a quantity of sample at a certain immersion depth.

Thus, in French Pat. No. 7,425,840 there has been disclosed a sensor syringe which indicates the liquid surface by virtue of pressure fluctuations or changes of a gas flow. A pipe or tube extends parallel to a sample duct or channel, the opening of the tube being arranged in spaced relationship with respect to the opening of the sample duct. The pressure of the gas flowing through the tube varies upon immersion of the tube opening into the liquid. This pressure fluctuation is detected by a measuring device and predicated upon the measurement result there is controlled sample removal.

This sensor syringe and the required structural expenditure of equipment needed for the measurement, regulation and storage of the gas necessitates a rather voluminous piece of equipment which cannot be constructed to have an advantageous small dimensional design. A further drawback resides in the undesired expenditure in work needed for refilling or exchanging the gas container.

Additionally, there are already known in this technology sensor syringes or duct arrangements wherein there are employed capacitances and inductances as well as changes thereof upon immersion into the liquid sample for the purpose of controlling sample removal. Also with these techniques the desired miniaturisation of the sensor syringe cannot be accomplished, and additionally there is demanded a disadvantageous coupling of the sensor electronic system with the sensor zone.

SUMMARY OF THE INVENTION

Therefore, with the foregoing in mind it is a primary object of the present invention to provide a new and improved construction of a sensor syringe or the like for the withdrawal of samples in a manner not associated with the aforementioned drawbacks and limitations of the prior art proposals.

Another and more specific object of the present invention aims at providing a new and improved construction of sensor syringe of the previously mentioned type which can be constructed at increased economies and with a compact small design.

A further significant object of the present invention aims at providing a new and improved construction of a sensor syringe arrangement which enables an automatic and reliable sample removal even when encountering inclined and difficultly accessible liquid surfaces, such as arise in centrifuges.

Now in order to implement these and still further objects of the invention, which will become more readily apparent as the description proceeds, the sensor syringe arrangement of the present development is manifested by the features that there is provided a hollow, light-conducting rod which surrounds in a sheath or jacket-like fashion the channel or duct of the sensor syringe. The hollow light-conducting rod utilises the phenomenon that during each sample withdrawal or removal there results a change in the reflection behaviour at the lower rod end upon immersion into the liquid sample, in order to thereby control sample withdrawal.

The sensor syringe of the present development has the further advantage that the sensor electronic system is decoupled from the sensor zone by virtue of the optical signal transmission which is employed.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
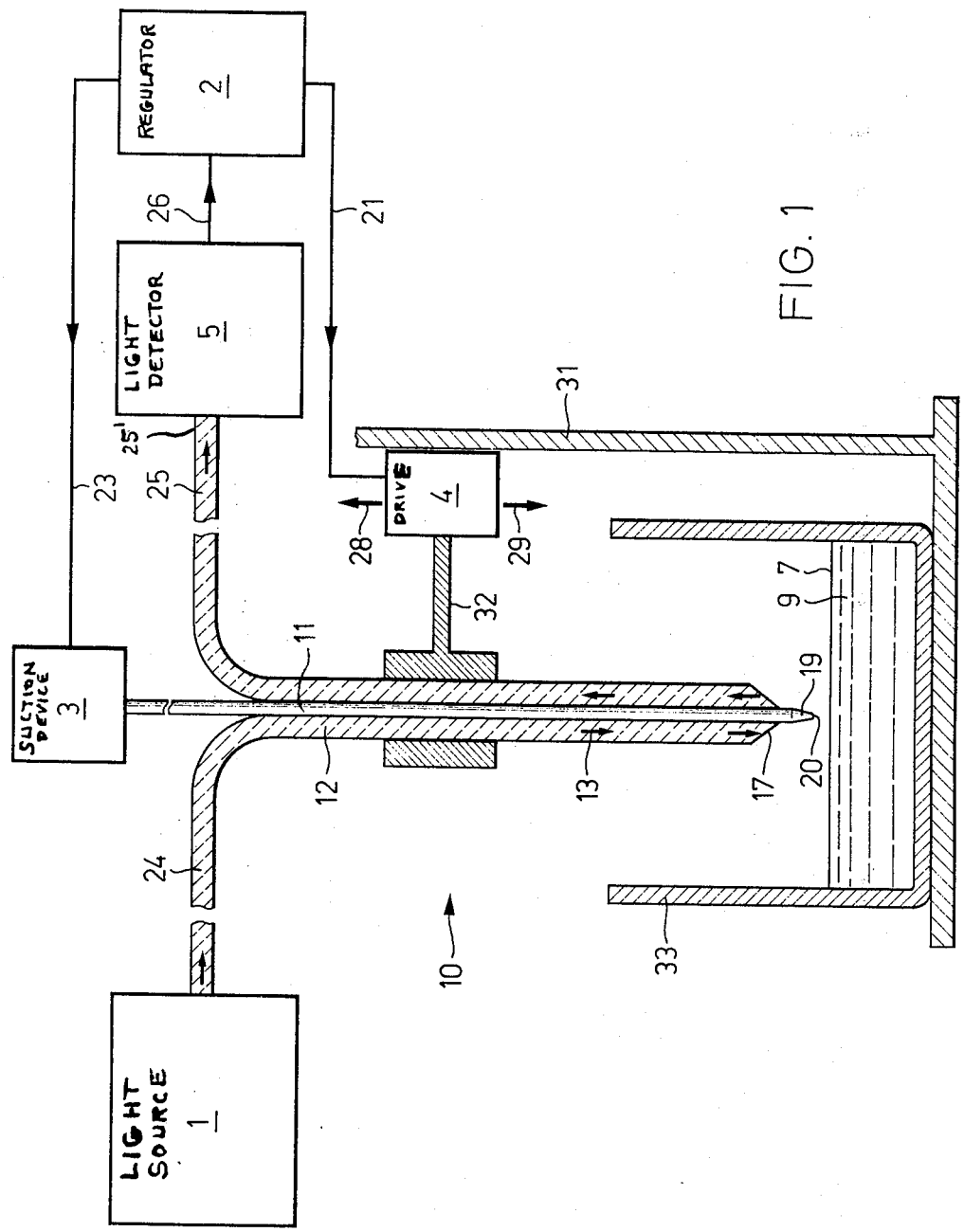
FIG. 1 is a sectional view of a sensor syringe and also schematically illustrating the components of a regulation circuit.

Describing now the drawings, in FIG. 1 there is shown in sectional view an exemplary embodiment of sensor syringe 10 and also schematically a light source 1, a regulator 2, a suction device 3, a drive 4, a light detector 5 as well as a duct or channel 11 shown in side view. The light source 1 transmits in conventional manner its emitted light to the branch 24 of a light-conducting rod 12. The branch 24 is formed by splitting the light-conducting rod 12 at its upper region of the showing of FIG. 1. Without any appreciable intensity losses and irrespective of the curvature of the rod 12 the light, generally indicated by the arrows 13, is conducted to the rod surface or end 17 where, depending upon the optical density or refractive index of the surrounding medium, it either departs out of the light-conducting rod 12 or is returned by reflection. By virtue of the mentioned splitting of the rod 12 there is formed, apart from the branch 24 a further rod branch 25 having a light exit location 25' operatively associated with a conventional light detector 5. This light detector 5 measures the intensity of the light which departs from the second branch 25 of the split rod 12. Detector 5 delivers the measured value in the form of an electrical signal by means of a line 26 to the regulator 2 which acts by means of a line or conductor 21 upon the drive or drive means 4 to move such selectively in either of both movement directions 28 and 29, and further, the detector 5 controls or regulates the suction device 3, for example a pump, by means of the line or conductor 23.

The sensor syringe 10 is secured by means of a holder 32 or equivalent structure at the drive or drive means 4 which can be displaced in both directions 28 and 29 along a rail or guide 31. The liquid sample 9 having the liquid surface 7 is contained within the schematically illustrated vessel or container 33 which, for instance, can be a whole blood pipette or small tube or a container of a centrifuge.

The end region or surface 17 of the light-conducting rod 12 is preferably conical in configuration and inclined at approximately 45° with respect to the lengthwise axis of the duct or channel 11. Thus, the conical surface may be considered to possess, by way of example, a half aperture angle of about 45°. However, the lower end of the light conductor, i.e. the light-conducting rod 12 can be spherical, prismatic or wedge-shape in configuration. The duct tip 19 protrudes past the rod surface 17 and is provided at its front end with a duct opening 20.

Figure 2:
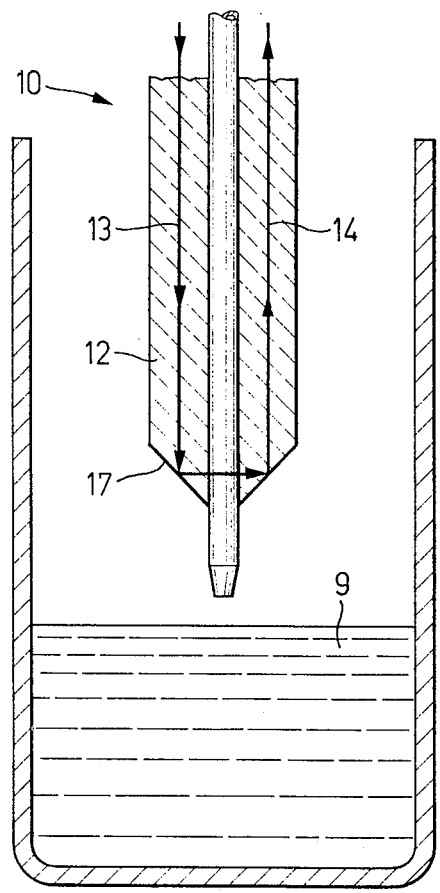
FIG. 2 is a sectional view of part of the sensor syringe and a vessel containing a liquid sample.

FIG. 2 illustrates the conditions which prevail when the sensor syringe 10 is not immersed in the liquid 9. The light beam 13 which is transmitted from the light source 1 (FIG. 1) to the light-conducting rod 12 is conducted in conventional manner up to the rod surface or end 17. Since the surrounding air has a smaller refractive index than the light-conducting rod 12 the light beam 13 is reflected at the surface 17 and conducted back in the direction 14 towards the detector 5.

Figure 3:
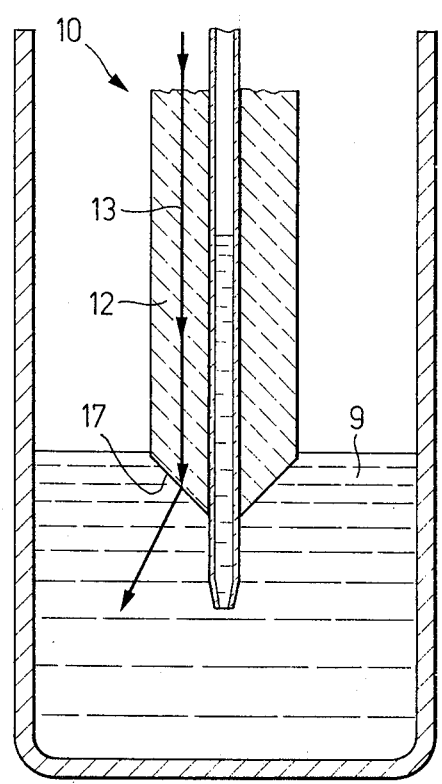
FIG. 3 is a sectional view, like the showing of FIG. 2, but illustrating the sensor syringe immersed in the liquid of the sample.

On the other hand, FIG. 3 shows the conditions prevailing when the sensor syringe 10 is immersed in the liquid sample. Now the rod surface 17 is immersed in the liquid 9 and consequently surrounded by a medium having a refractive index similar to that of the light-conducting rod 12. The light beam 13 which impinges at the rod surface 17 and delivered by the light source 1 is refracted and escapes into the liquid 9, as shown in FIG. 3. Consequently, the detector 5 measures no or only very little light when the rod surface 17 is immersed in the liquid sample or liquid 9.

While there are shown and described present preferred embodiments of the invention, it is to be distinctly understood that the invention is not limited thereto, but may be otherwise variously embodied and practiced within the scope of the following claims. ACCORDINGLY,

What I claim is:

1. An arrangement for positioning a duct of a sample withdrawal device for the withdrawal of a sample from a liquid contained within a vessel and wherein the duct automatically is positionally adjusted with respect to an unknown liquid surface of the sample, comprising:

a duct through which the sample is withdrawn;
   a hollow, light-conducting rod surrounding the duct in a substantially sheath-like fashion;
   said light-conducting rod having a lower end;
   suction means cooperating with the duct for removal of the liquid sample from the vessel through the duct;
   controlling means, including drive means, for positionally adjusting the lower end of said light-conducting rod in relation to the level of the liquid sample in the vessel; and
   means for detecting the change in the light reflection behavior of the lower end of the light-conducting rod upon its immersion into the liquid and for signalling said controlling means that the duct surrounded by said light-conducting rod is in position to withdraw a liquid sample from the vessel.

2. The arrangement as defined in claim 1, wherein:
   the lower end of the light-conducting rod possesses a conical surface having a half aperture angle of approximately 45°.

3. The arrangement as defined in claim 1, further including:
   means cooperating with said light-conducting rod for controlling sample withdrawal as a function of said change in the light reflection behaviour of the lower end of the rod upon its immersion into the liquid.

* * * * *